United States Patent
Liang et al.

(10) Patent No.: US 10,677,370 B2
(45) Date of Patent: Jun. 9, 2020

(54) FLOW REGULATING APPARATUS AND GAS WATER HEATER HAVING SAME

(71) Applicant: WUHU MIDEA KITCHEN AND BATH APPLIANCES MFG. CO., LTD., Wuhu (CN)

(72) Inventors: Guorong Liang, Wuhu (CN); Wei Fan, Wuhu (CN)

(*) Notice: Subject to any disclaimer, the term of this patent is extended or adjusted under 35 U.S.C. 154(b) by 191 days.

(21) Appl. No.: 15/985,712

(22) Filed: May 22, 2018

(65) Prior Publication Data

US 2018/0266579 A1 Sep. 20, 2018

Related U.S. Application Data

(63) Continuation of application No. PCT/CN2016/080404, filed on Apr. 27, 2016.

(30) Foreign Application Priority Data

Dec. 23, 2015 (CN) .......................... 2015 1 0988282
Dec. 23, 2015 (CN) ..................... 2015 2 1104455 U

(51) Int. Cl.
*F24H 9/20* (2006.01)
*F16K 31/00* (2006.01)
(Continued)

(52) U.S. Cl.
CPC ........ *F16K 31/002* (2013.01); *F16K 37/0008* (2013.01); *F24H 1/0027* (2013.01);
(Continued)

(58) Field of Classification Search
CPC .......... G05D 7/01; G05D 7/012; E03C 1/084; E03C 2001/026; F16L 55/027; F16L 55/02781; F24H 9/20; F16K 37/00
See application file for complete search history.

(56) References Cited

U.S. PATENT DOCUMENTS

| 3,438,574 A | 4/1969 | Killias |
| 3,536,103 A * | 10/1970 | Tomlinson ........... G05D 23/123 138/43 |

(Continued)

FOREIGN PATENT DOCUMENTS

| CN | 2145296 Y | 11/1993 |
| CN | 101932984 A | 12/2010 |

(Continued)

OTHER PUBLICATIONS

European Search Report dated Oct. 30, 2018 in the corresponding EP application (application No. 16877166.5).
(Continued)

*Primary Examiner* — Gregory A Wilson
(74) *Attorney, Agent, or Firm* — Kilpatrick Townsend & Stockton, LLP

(57) ABSTRACT

A flow regulating device (60) and a gas water heater (1) having the same are provided. The flow regulating device (60) includes a housing (100) defining a water inlet (110) and a water outlet (120) therein; a flow regulating assembly (200) disposed in the housing (100), a temperature-flow regulating orifice (230) located between the water inlet (110) and the water outlet (120) being defined in the flow regulating assembly (200), and the flow regulating assembly (200) further including a regulating component for regulating opening of the temperature-flow regulating orifice (230); a temperature sensitive assembly (300) disposed in the housing (100) and connected to the regulating component, and the temperature sensitive assembly (300) driving the regulating component according to temperature of water in the housing (100). The flow regulating device has advantages of short regulating time, and high regulating precision.

18 Claims, 6 Drawing Sheets

(51) Int. Cl.
*G05D 7/01* (2006.01)
*F24H 1/00* (2006.01)
*F16K 37/00* (2006.01)
*F24D 19/10* (2006.01)
*G05D 23/02* (2006.01)

(52) U.S. Cl.
CPC ......... *G05D 7/012* (2013.01); *F24D 19/1051* (2013.01); *F24H 9/2035* (2013.01); *G05D 23/022* (2013.01)

(56) References Cited

U.S. PATENT DOCUMENTS

| | | | |
|---|---|---|---|
| 8,485,220 B2* | 7/2013 | Riano Gutierrez | G05D 7/0133 137/513.3 |
| 8,931,706 B2* | 1/2015 | Lin | G05D 23/1353 236/12.1 |
| 9,359,224 B2* | 6/2016 | Senninger | C02F 1/003 |
| 9,677,680 B2* | 6/2017 | Tempel | E03C 1/025 |
| 9,982,423 B2* | 5/2018 | Zhou | E03C 1/084 |
| 2011/0168927 A1* | 7/2011 | Yuan | F16K 11/044 251/11 |
| 2012/0017697 A1* | 1/2012 | Benzo | G01F 1/56 73/861.04 |
| 2018/0306617 A1* | 10/2018 | Bonomi | F16K 27/067 |
| 2019/0186113 A1* | 6/2019 | Chang | G05D 23/022 |

FOREIGN PATENT DOCUMENTS

| | | | |
|---|---|---|---|
| CN | 202032159 U | 11/2011 | |
| CN | 204201208 U | 3/2015 | |
| CN | 105221826 A | 1/2016 | |
| CN | 205446902 U | 8/2016 | |
| GB | 2339885 A | 2/2000 | |
| GB | 2015-430123 | * 7/2015 | ............ G05D 7/012 |
| GB | 2522464 A | 7/2015 | |
| WO | 2005026597 A1 | 3/2005 | |

OTHER PUBLICATIONS

CN First Office Action dated Jul. 27, 2017 in the corresponding CN application (application No. 201510988282.5).
Australian Examination Report No. 1 for Standard Patent Application dated Aug. 9, 2018 in the corresponding Australian application (application No. 2016379511).

* cited by examiner

FLOW REGULATING APPARATUS AND GAS WATER HEATER HAVING SAME

CROSS-REFERENCE TO RELATED APPLICATION

This application is a continuation of International Application PCT/CN2016/080404, filed Apr. 27, 2016, which claims priority to and benefits of Chinese Patent Application Serial No. 201510988282.5 and 201521104455.4, filed with the State Intellectual Property Office of P. R. China on Dec. 23, 2015, the entire contents of which are incorporated herein by reference.

FIELD

The present disclosure relates to a field of water heaters, specifically to a flow regulating device and a gas water heater having the flow regulating device.

BACKGROUND

A water heater in the related art usually employs a stepping motor type water proportional valve, a memory alloy type water proportional valve, or a manual knob opening type water regulating valve to control flow rate of inflowing water. In which, when the stepping motor type water proportional valve is employed, regulation of the flow rate of the water cannot be completed at one time due to a certain process of control, judgment and feedback, and repeated regulations are required to approach the desired flow rate of the water, a response time is prolonged, thereby causing large fluctuation of the flow rate and temperature of outflowing water. When the memory alloy type water proportional valve is employed, the flow rate of the water pulsates and is unstable during regulation due to limitation of characteristics of the memory alloy, which results in low comfort for use. When the manual knob opening type regulating valve is employed, since the opening is hard to master, the temperature of the outputting water cannot be accurate to the desired temperature.

SUMMARY

The present disclosure seeks to solve at least one of the problems existing in the related art to at least some extent. To this end, the present disclosure proposes a flow regulating device having advantages of short regulating time, high regulating precision, and can improve stability of flow rate and temperature of outflowing water of the water heater.

The present disclosure further proposes a gas water heater having the flow regulating device.

To achieve the above purpose, the flow regulating device according to embodiments of a first aspect of the present disclosure includes a housing defining a water inlet and a water outlet therein; a flow regulating assembly disposed in the housing, a temperature-flow regulating orifice located between the water inlet and the water outlet being defined in the flow regulating assembly, and the flow regulating assembly further including a regulating component for regulating opening of the temperature-flow regulating orifice; a temperature sensitive assembly disposed in the housing and connected to the regulating component, and the temperature sensitive assembly driving the regulating component according to temperature of water in the housing.

The flow regulating device according to embodiments of the present disclosure has advantages of short regulating time, high regulating precision, and can improve the stability of the flow rate and the temperature of the outflowing water of the water heater.

In addition, the flow regulating device according to embodiments of the present disclosure may also include the following additional technical features.

According to an embodiment of the present disclosure, the temperature sensitive assembly includes: a fixed temperature sensitive casing mounted in the housing; a movable sleeve movably fitted over the fixed temperature sensitive casing and connected to the regulating component; a temperature sensitive element with a changeable volume according to temperature, disposed between the fixed temperature sensitive casing and the movable sleeve, the temperature sensitive element pushing the movable sleeve to move in a direction away from the fixed temperature sensitive casing by means of its own expansion; a support seat mounted in the housing; and a temperature sensitive elastic element disposed between the movable sleeve and the support seat and pushing the movable sleeve towards the fixed temperature sensitive casing.

According to an embodiment of the present disclosure, the fixed temperature sensitive casing includes: a mounting seat mounted in the housing; a temperature sensitive outer casing, the temperature sensitive outer casing and the movable sleeve defining an accommodating cavity with a changeable volume together, and the temperature sensitive element being disposed in the accommodating cavity; and a supporting elastic element disposed between the temperature sensitive outer casing and the movable sleeve, the temperature sensitive outer casing abutting against the mounting seat under action of the supporting elastic element, and a temperature sensitive channel being defined between the temperature sensitive outer casing and the mounting seat.

According to an embodiment of the present disclosure, the supporting elastic element is a spring, the temperature sensitive outer casing is provided with a temperature sensitive boss, the supporting elastic element is fitted over the temperature sensitive outer casing, and two ends of the supporting elastic element abut against the temperature sensitive boss and the movable sleeve respectively.

According to an embodiment of the present disclosure, the temperature sensitive elastic element is a spring, the movable sleeve is provided with a sleeve boss, the temperature sensitive elastic element is fitted over the movable sleeve, two ends of the temperature sensitive elastic element abut against the sleeve boss and the support seat respectively, a sleeve channel is defined in the sleeve boss, and a support seat channel is defined between the movable sleeve and the support seat.

According to an embodiment of the present disclosure, the temperature sensitive element is paraffin.

According to an embodiment of the present disclosure, the flow regulating assembly includes: a fixed seat mounted in the housing, the temperature-flow regulating orifice being defined in the fixed seat; the regulating component being a movable column connected to the temperature sensitive assembly, and the movable column regulating the opening of the temperature-flow regulating orifice by moving relative to the fixed seat.

According to an embodiment of the present disclosure, the temperature-flow regulating orifice is a conical orifice having a cross-sectional area increasing gradually from the water outlet to the water inlet, the movable column is provided with a conical part having a shape conforming to a shape of the conical orifice, and the movable column regulates the opening of the temperature-flow regulating orifice by changing a position of the conical part in the temperature-flow regulating orifice.

According to an embodiment of the present disclosure, the water inlet and the water outlet are defined at two ends of the housing in an axial direction of the housing respectively, the flow regulating assembly and the temperature sensitive assembly are arranged in the axial direction of the housing and located between the water inlet and the water outlet along the axial direction of the housing.

According to an embodiment of the present disclosure, the flow regulating device further includes: a pressure sensitive assembly disposed in the housing, a pressure-flow regulating orifice with a changeable cross-sectional area being defined between the pressure sensitive assembly and the flow regulating assembly, and being located between the water inlet and the water outlet, and the pressure sensitive assembly regulating the cross-sectional area of the pressure-flow regulating orifice according to pressure of water in the housing.

According to an embodiment of the present disclosure, the pressure sensitive assembly includes: two pressure sensitive clamping element disposed in the housing and close to or away from each other; and a pressure sensitive element with a changeable shape according to pressure, disposed between the two pressure sensitive clamping elements, the pressure-flow regulating orifice being defined between the pressure sensitive element and the flow regulating assembly, and the pressure sensitive element regulating the cross-sectional area of the pressure-flow regulating orifice by means of its own deformation.

According to an embodiment of the present disclosure, the pressure sensitive element is rubber.

According to an embodiment of the present disclosure, the water inlet and the water outlet are defined at two ends of the housing in an axial direction of the housing respectively, the flow regulating assembly, the temperature sensitive assembly and the pressure sensitive assembly are arranged in the axial direction of the housing and located between the water inlet and the water outlet along the axial direction of the housing.

According to an embodiment of the present disclosure, the flow regulating device further includes a flow feedback assembly disposed to the housing and configured to detect a flow rate of water in the housing and performing feedback.

According to an embodiment of the present disclosure, the flow feedback assembly includes a turbine blade rotatably disposed in the housing, and driving a nearby water stream to rotate while rotating; a magnetic rotor rotatably disposed in the housing and adjacent to turbine blade, the magnetic rotor being rotated by the rotating water stream; and a hall element mounted to an outer wall of the housing, the hall element judging the flow rate of the water by sensing rotation of the magnetic rotor and performing feedback.

According to an embodiment of the present disclosure, the flow feedback assembly further includes a rotating shaft seat mounted in the housing; and a rotating shaft mounted to the rotating shaft seat, the turbine blade and the magnetic rotor being rotatably mounted to the rotating shaft.

According to an embodiment of the present disclosure, the water inlet and the water outlet are defined at two ends of the housing in an axial direction of the housing respectively, the flow regulating assembly, the temperature sensitive assembly and the flow feedback assembly are arranged in the axial direction of the housing and located between the water inlet and the water outlet along the axial direction of the housing, and the flow feedback assembly is disposed adjacent to one of the water inlet and the water outlet.

The gas water heater according to embodiments of a second aspect of the present disclosure includes a heat exchange system; a water inlet device in communication with the heat exchange system; a water outlet device in communication with the heat exchange system; a combustion system for heating the heat exchange system; a gas control system in communication with the combustion system; and a flow regulating device, in which the flow regulating device is the flow regulating device according to embodiments of the first aspect of the present disclosure, the flow regulating device is connected between the water inlet device and the heat exchange system, the water inlet is in communication with the water inlet device, and the water outlet is in communication with the heat exchange system.

The gas water heater according to embodiments of the present disclosure, by using the flow regulating device according to embodiments of the first aspect of the present disclosure, has advantages of stable flow rate and temperature of the outflowing water, high comfort for use, and so on.

According to an embodiment of the present disclosure, the flow regulating device includes the flow feedback assembly, the gas water heater further includes a control system communicating with the flow feedback assembly and the gas control system, and the control system controls a proportion of gas supply in the gas control system according to the flow rate of the water fed back by the flow feedback assembly.

Figure 1:
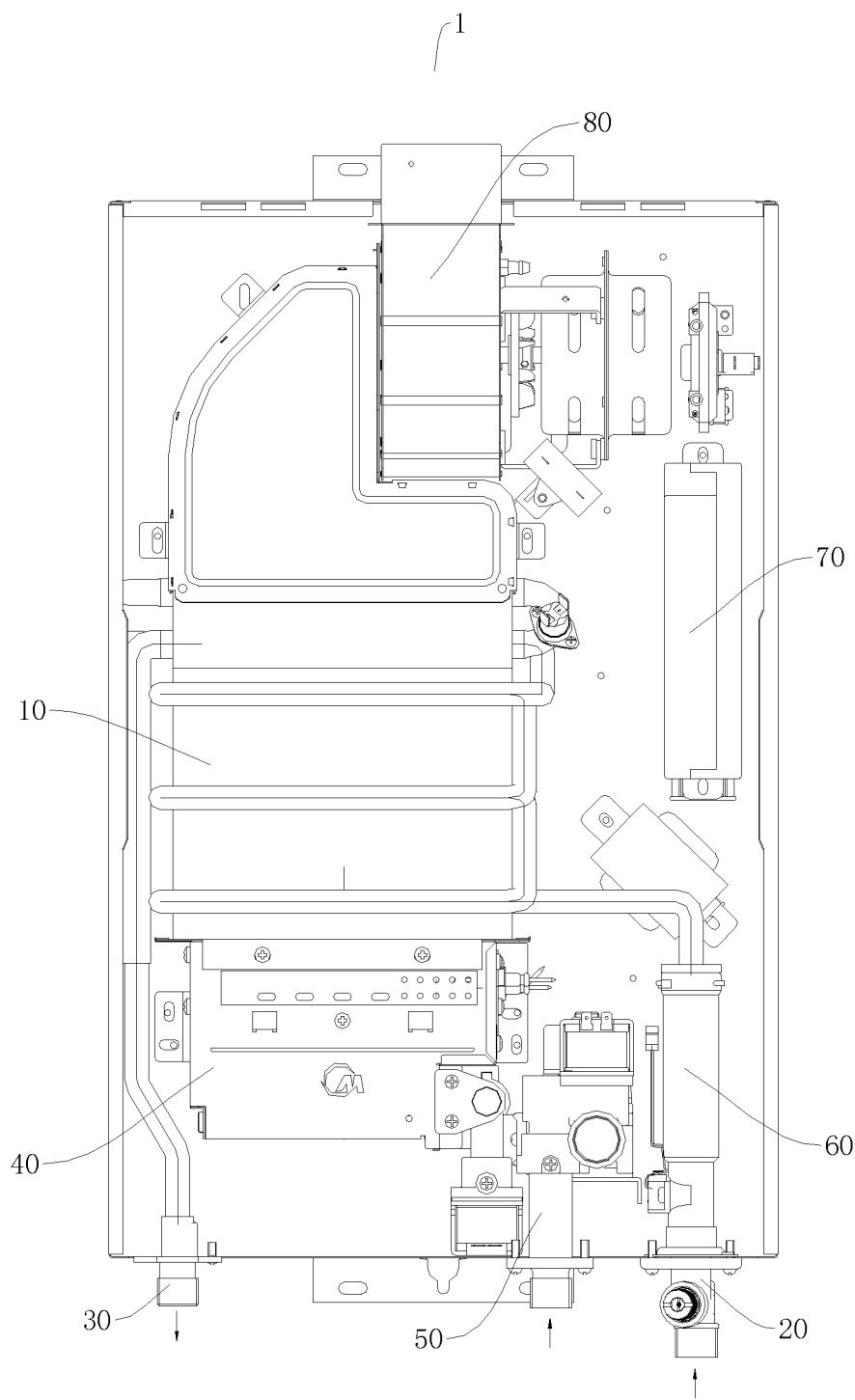
FIG. 1 illustrates a schematic view of a gas water heater according to an embodiment of the present disclosure.
Figure 2:
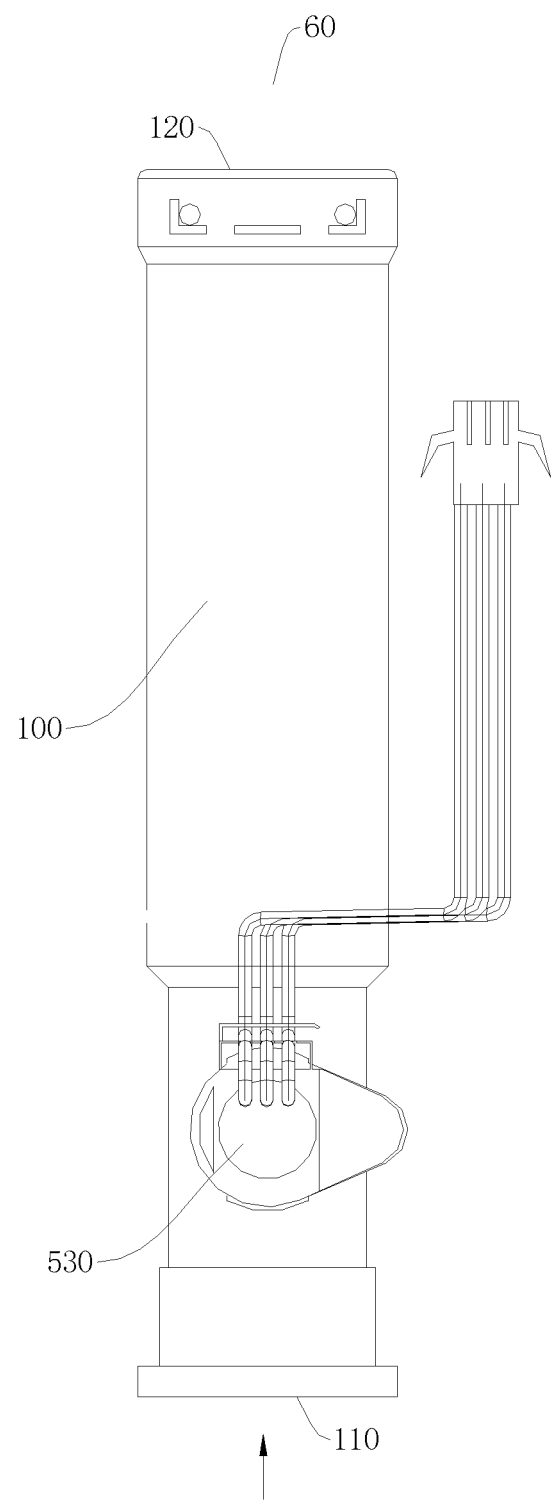
FIG. 2 is a schematic view of a flow regulating device according to an embodiment of the present disclosure.

REFERENCE NUMERALS gas water heater 1;

heat exchange system 10; water inlet device 20; water outlet device 30; combustion system 40; gas control system 50; flow regulating device 60; control system 70; exhaust system 80;

housing 100; water inlet 110; water outlet 120;

flow regulating assembly 200; fixed seat 210; movable column 220; conical part 221; temperature-flow regulating orifice 230;

temperature sensitive assembly 300; fixed temperature sensitive casing 310; mounting seat 311; temperature sensitive outer casing 312; supporting elastic element 313; temperature sensitive channel 314; temperature sensitive boss 315; movable sleeve 320; sleeve boss 321; sleeve channel 322; temperature sensitive element 330; support seat 340; support seat channel 341; temperature sensitive elastic element 350;

pressure sensitive assembly 400; pressure sensitive clamping element 410; pressure sensitive element 420; pressure-flow regulating orifice 430;

flow feedback assembly 500; turbine blade 510; magnetic rotor 520; hall element 530; rotating shaft seat 540; rotating shaft 550.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

A gas water heater 1 according to embodiments of the present disclosure will be described with reference to drawings hereinafter.

Figure 4:
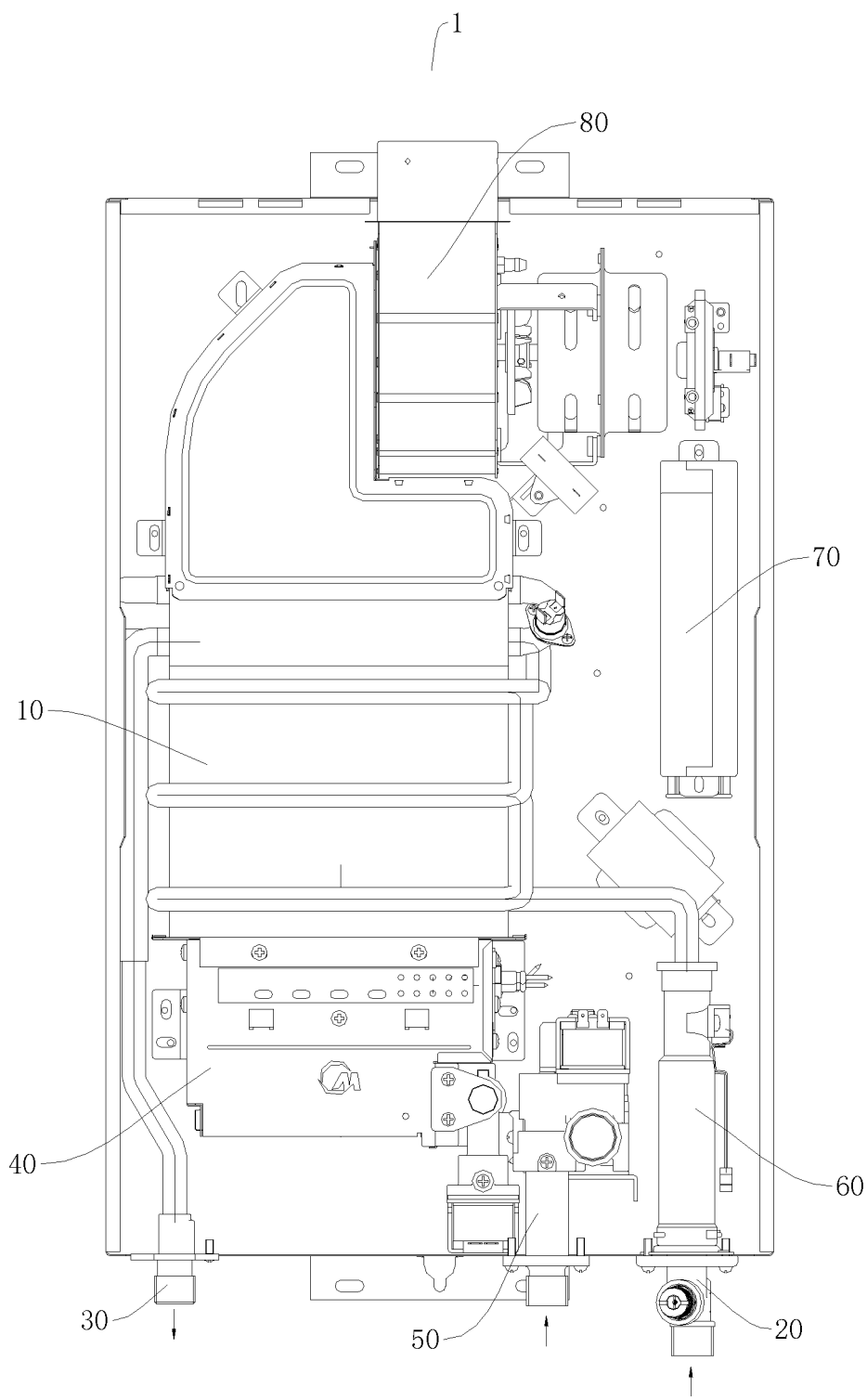
FIG. 4 is a schematic view of a gas water heater according to another embodiment of the present disclosure.
Figure 5:
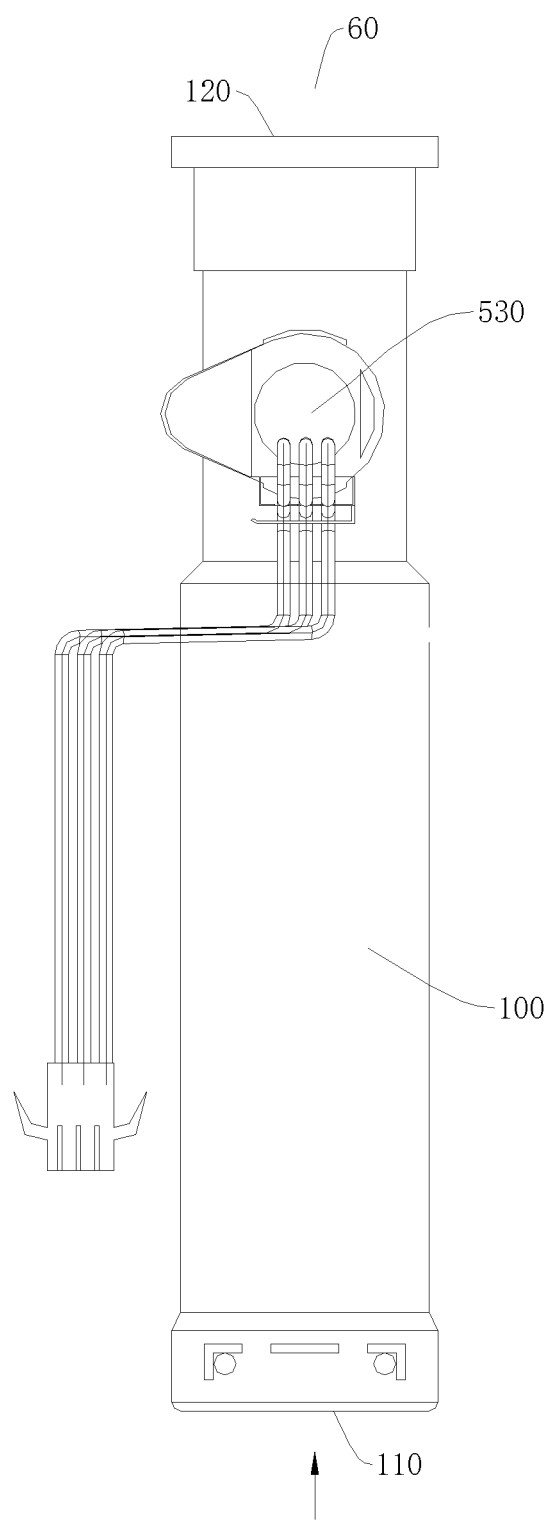
FIG. 5 is a schematic view of a flow regulating device according to another embodiment of the present disclosure.

As illustrated in FIGS. 1 and 4, the gas water heater 1 according to embodiments of the present disclosure includes a heat exchange system 10, a water inlet device 20, a water outlet device 30, a combustion system 40, a gas control system 50, a flow regulating device 60, a control system 70 and an exhaust system 80.

Firstly, the flow regulating device 60 according to embodiments of the present disclosure will be described below with reference to the drawings.

As illustrated in FIGS. 1 to 6, the flow regulating device 60 according to embodiments of the present disclosure includes a housing 100, a flow regulating assembly 200, a temperature sensitive assembly 300, a pressure sensitive assembly 400 and a flow feedback assembly 500.

The housing 100 defines a water inlet 110 and a water outlet 120. The flow regulating assembly 200 is disposed in the housing 100, the flow regulating assembly 200 defines a temperature-flow regulating orifice 230 between the water inlet 110 and the water outlet 120, and the flow regulating assembly 200 further includes a regulating component for regulating opening of the temperature-flow regulating orifice 230. The temperature sensitive assembly 300 is disposed in the housing 100 and connected to the regulating component, the temperature sensitive assembly 300 drives the regulating component according to temperature of water in the housing 100 so as to regulate the opening of the temperature-flow regulating orifice 230, and further regulate a flow rate of the water. The pressure sensitive assembly 400 is disposed in the housing 100, a pressure-flow regulating orifice 430 is defined between the pressure sensitive assembly 400 and the flow regulating assembly 200 and located between the water inlet 110 and the water outlet 120, and a cross-sectional area of the pressure-flow regulating orifice 430 is changeable. The pressure sensitive assembly 400 regulates the cross-sectional area of the pressure-flow regulating orifice 430 according to pressure of the water in the housing 100 so as to regulate the flow rate of the water. The flow feedback assembly 500 is disposed to the housing 100 and configured to detect the flow rate of the water in the housing 100 and perform feedback.

In the gas water heater 1 according to embodiments of the present disclosure, the water inlet device 20 is in communication with the heat exchange system 10. The water outlet device 30 is in communication with the heat exchange system 10. The combustion system 40 is used for heating the heat exchange system 10. The gas control system 50 is in communication with the combustion system 40, and used for controlling a gas volume supplied to the combustion system 40. The flow regulating device 60 is connected between the water inlet device 20 and the heat exchange system 10, the water inlet 110 is in communication with the water inlet device 20, and the water outlet 120 is in communication with the heat exchange system 10. The exhaust system 80 is used for discharging a flue gas produced by the combustion system 40. The control system 70 communicates with the flow feedback assembly 500 of the flow regulating device 60 and the gas control system 50, and the control system 70 controls a proportion of gas supply in the gas control system 50 according to the flow rate of the water fed back by the flow feedback assembly 500, so as to control a combustion load of the combustion system 40 to obtain an ideal temperature of outflowing water.

A flow control process of the flow regulating device 60 according to embodiments of the present disclosure will be described below.

When the temperature of the water is low, the opening of temperature-flow regulating orifice 230 is reduced, such that the flow rate of the water is controlled to become smaller. When the temperature of the water is high, the opening of temperature-flow regulating orifice 230 is enlarged, such that the flow rate of the water is controlled to become larger.

When the pressure of the water is large, the cross-sectional area of the pressure-flow regulating orifice 430 is reduced, such that the maximum flow rate of the water is controlled at a set value. When the pressure of the water is small, the pressure-flow regulating orifice 430 returns to an initial cross-sectional area.

In the flow regulating device 60 according to embodiments of the present disclosure, the temperature sensitive assembly 300, the pressure sensitive assembly 400 and the flow regulating assembly 200 are provided, and the temperature-flow regulating orifice 230 with the regulatable opening is defined in the flow regulating assembly 200, the pressure-flow regulating orifice 430 with a changeable cross-sectional area is defined between the pressure sensitive assembly 400 and the flow regulating assembly 200, thus the flow rate of the water can be controlled according to the temperature and the pressure of the water, thereby improving stability of the flow rate and the temperature of the outflowing water from the gas water heater 1. Moreover, since repeated judgment and calculation are needless, response time is shortened, precision of flow regulation is high, and the flow rate and the temperature of the outflowing water from the gas water heater 1 have a small fluctuation to provide high comfort for use.

In addition, by providing the flow feedback assembly 500, the actual flow rate of the water can be detected and fed back to the control system 70 of the gas water heater 1, such that the control system 70 can control the combustion in the combustion system 40, according to water inflow, to ensure the temperature of the outflowing water from the gas water heater 1.

Accordingly, the flow regulating device 60 according to embodiments of the present disclosure has advantages of short regulating time, high regulating precision, and can improve stability of the flow rate and the temperature of the outflowing water from the water heater, achieve feedback of the flow rate of the water.

In the gas water heater 1 according to embodiments of the present disclosure, by utilizing the flow regulating device 60 according to the above embodiments of the present disclosure, the flow rate of the inflowing water can be regulated automatically according to changes in the temperature and the pressure of the inflowing water, and the flow rate of the inflowing water can be fed back to the control system 70 to regulate the combustion load so as to achieve the ideal temperature of the outflowing water, such that the gas water heater 1 has advantages of the stable flow rate and temperature of the outlet water, the high comfort for use, and so on.

Other constitutions and operations of the gas water heater 1 according to embodiments of the present disclosure, which will not be described in detail herein.

The flow regulating device 60 according to specific embodiments of the present disclosure will be described below with reference to the drawings. As illustrated in FIGS. 1 to 6, the flow regulating device 60 according to embodiments of the present disclosure includes the housing 100, the flow regulating assembly 200, the temperature sensitive assembly 300, the pressure sensitive assembly 400 and the flow feedback assembly 500.

Figure 3:
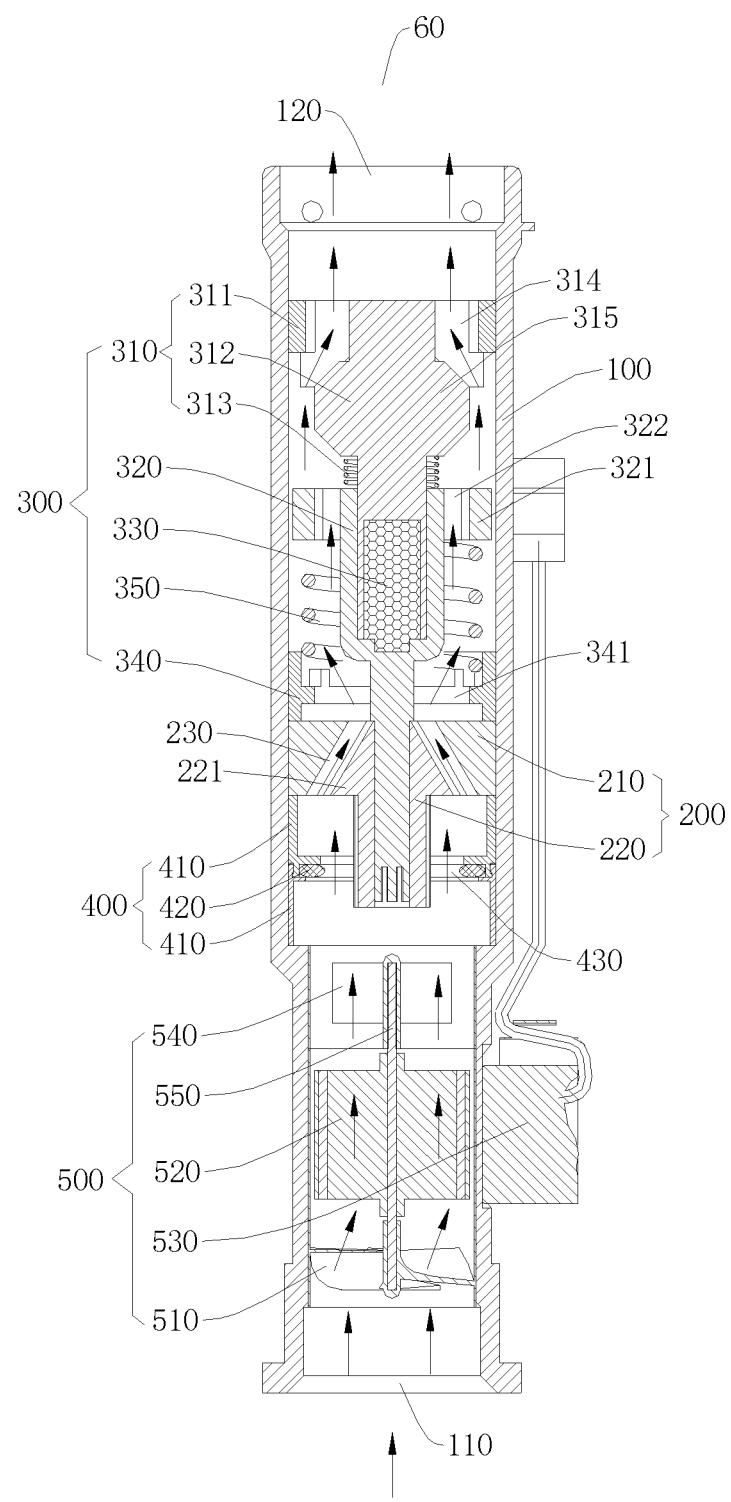
FIG. 3 is a sectional view of a flow regulating device according to an embodiment of the present disclosure.
Figure 6:
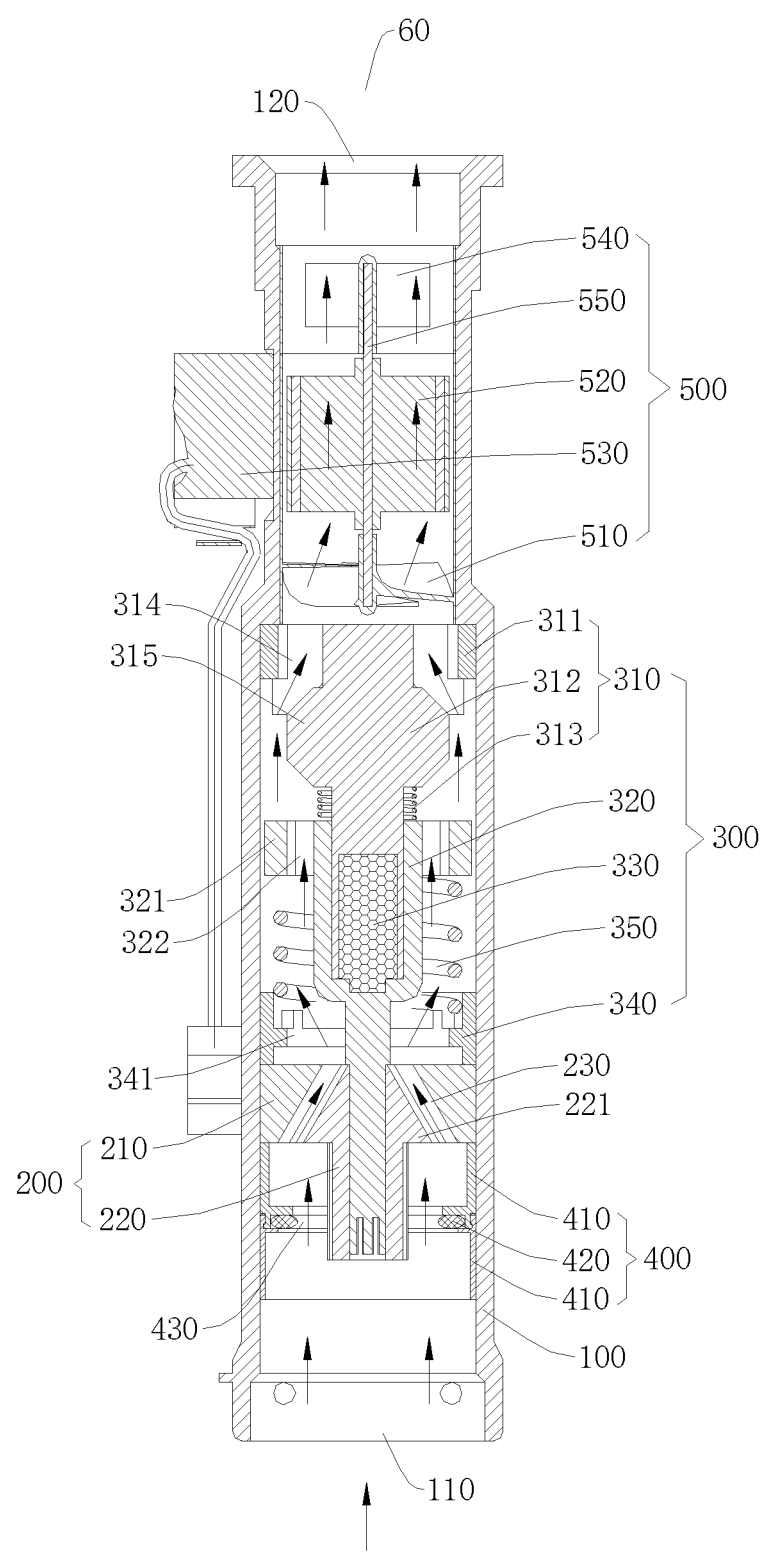
FIG. 6 is a sectional view of a flow regulating device according to another embodiment of the present disclosure.

The flow regulating device 60 according to some specific embodiments of the present disclosure is illustrated in FIGS. 3 and 6. As illustrated in FIGS. 3 and 6, the temperature sensitive assembly 300 includes a fixed temperature sensitive casing 310, a movable sleeve 320, a temperature sensitive element 330, a support seat 340 and a temperature sensitive elastic element 350.

The fixed temperature sensitive casing 310 is mounted in the housing 100 and in a fixed position. The movable sleeve 320 is movably fitted over the fixed temperature sensitive casing 310 and connected to the regulating component. The volume of the temperature sensitive element 330 linearly changes according to the temperature. For example, the temperature sensitive element 330 is paraffin, the temperature sensitive element 330 is disposed between the fixed temperature sensitive casing 310 and the movable sleeve 320, the temperature sensitive element 330 pushes the movable sleeve 320 to move in a direction away from the fixed temperature sensitive casing 310 by means of its own expansion. The temperature sensitive elastic element 350 is disposed between the movable sleeve 320 and the support seat 340, and pushes the movable sleeve 320 towards the fixed temperature sensitive casing 310.

When the temperature of the water in the housing 100 is high, the temperature sensitive element 330 expands and pushes the movable sleeve 320 to move in the direction away from the fixed temperature sensitive casing 310, and drives the regulating component, and the opening of the temperature-flow regulating orifice 230 of the fixed temperature sensitive casing 200 is enlarged, thereby increasing the flow rate of the water. When the temperature of the water in the housing 100 is low, the temperature sensitive element 330 contracts, the movable sleeve 320 moves towards the fixed temperature sensitive casing 310 under the action of the temperature sensitive elastic element 350 and drives the regulating component, and the opening of the temperature-flow regulating orifice 230 of the fixed temperature sensitive casing 200 is reduced, thereby reducing the flow rate of the water.

In one embodiment, as illustrated in FIGS. 3 and 6, the fixed temperature sensitive casing 310 includes a mounting seat 311, a temperature sensitive outer casing 312 and a supporting elastic element 313.

The mounting seat 311 is mounted in the housing 100 and in a fixed position. The temperature sensitive outer casing 312 and the movable sleeve 320 define an accommodating cavity with a changeable volume together, and the temperature sensitive element 330 is disposed in the accommodating cavity. The supporting elastic element 313 is disposed between the temperature sensitive outer casing 312 and the movable sleeve 320, the temperature sensitive outer casing 312 abuts against the mounting seat 311 under action of the supporting elastic element 313, and a temperature sensitive channel 314 is defined between the temperature sensitive outer casing 312 and the mounting seat 311. Thus, the mounting and positioning of the temperature sensitive element 330 can be achieved, and the position of the temperature sensitive outer casing 312 can be ensured to be fixed without influence on flowing of the water.

In some embodiment, the temperature sensitive outer casing 312 and the movable sleeve 320 are each a heat conduction element in order to enable the temperature sensitive element 330 to accurately sense the temperature of the water in the housing 100.

Further, as illustrated in FIGS. 3 and 6, the supporting elastic element 313 is a spring, the temperature sensitive outer casing 312 is provided with a temperature sensitive boss 315, the supporting elastic element 313 is fitted over the temperature sensitive outer casing 312, and two ends of the supporting elastic element 313 abut against the temperature sensitive boss 315 and the movable sleeve 320 respectively to achieve the mounting and positioning of the supporting elastic element 313.

In one embodiment, as illustrated in FIGS. 3 and 6, the temperature sensitive elastic element 350 is a spring, the movable sleeve 320 is provided with a sleeve boss 321, the temperature sensitive elastic element 350 is fitted over the movable sleeve 320, and two ends of the temperature sensitive elastic element 350 abut against the sleeve boss 321 and the support seat 340 respectively. The sleeve boss 321 defines a sleeve channel 322 therein and a support seat channel 341 is defined between the movable sleeve 320 and the support seat 340. Thus, the mounting and positioning of the temperature sensitive elastic element 350 can be achieved without influence on the flowing of the water.

The flow regulating device 60 according to some specific examples of the present disclosure is illustrated in FIGS. 3 and 6. As illustrated in FIGS. 3 and 6, the flow regulating assembly 200 further includes a fixed seat 210 in addition to the regulating component.

The fixed seat 210 is mounted in the housing 100 and in a fixed position, and the temperature-flow regulating orifice 230 is defined in the fixed seat 210. The regulating component is a movable column 220 connected to the movable sleeve 320 of the temperature sensitive assembly 300. For example, the movable column 220 is fitted over the movable sleeve 320, the movable column 220, driven by the movable sleeve 320, is movable relative to the fixed seat 210, and the movable column 220 regulates the opening of the temperature-flow regulating orifice 230 by moving relative to the fixed seat 210.

In one embodiment, as illustrated FIGS. 3 and 6, the temperature-flow regulating orifice 230 is a conical orifice having a cross-sectional area increasing gradually from the water outlet 120 to the water inlet 110, the movable column 220 is provided with a conical part 221 having a shape conforming to a shape of the conical orifice. When the movable sleeve 320 moves, the movable column 220 is driven to move relative to the fixed seat 210, and the opening of the temperature-flow regulating orifice 230 is adjusted by changing a position of the conical part 221 in the conical orifice.

In one embodiment, when the temperature of the water in the housing 100 is high, the temperature sensitive element 330 expands and pushes the movable sleeve 320 to move in the direction away from the fixed temperature sensitive casing 310, and the movable sleeve 320 drives the movable column 220 to move relative to the fixed seat 210, the conical part 221 moves in a direction out of the conical orifice, such that the opening of the temperature-flow regulating orifice 230 is enlarged, thereby increasing the flow rate of the water.

When the temperature of the water in the housing 100 is low, the temperature sensitive element 330 contracts, the movable sleeve 320 moves towards the fixed temperature sensitive casing 310 under the action of the temperature sensitive elastic element 350, and the movable sleeve 320 drives the movable column 220 to move relative to the fixed seat 210, the conical part 221 moves towards the conical orifice, such that the opening of the temperature-flow regulating orifice 230 is reduced, thereby reducing the flow rate of the water.

The flow regulating device 60 according to some specific embodiments of the present disclosure is illustrated in FIGS. 3 and 6. As illustrated in FIGS. 3 and 6, the pressure sensitive assembly 400 includes two pressure sensitive clamping elements 410 and a pressure sensitive element 420.

The two pressure sensitive clamping elements 410 are disposed in the housing 100, in which the two pressure sensitive clamping elements 410 may be close to or away from each other, and directions of movements the two pressure sensitive clamping elements relative to each other are parallel to a direction of the water flow. A shape of the pressure sensitive element 420 is elastically changeable according to the pressure. For example, the pressure sensitive element 420 is a rubber ring, the pressure sensitive element 420 is disposed between the pressure sensitive clamping elements 410, and a pressure-flow regulating orifice 430 is defined between the pressure sensitive element 420 and the movable column 220 of the flow regulating assembly 200. The pressure sensitive element 420 regulates a cross-sectional area of the pressure-flow regulating orifice 430 by means of its own deformation to achieve a steady flow.

One of the pressure sensitive clamping elements 410 can be limited at a maximum travel by means of the fixed seat 210, while the other of the pressure sensitive clamping elements 410 can be limited at a maximum travel by means of a boss constructed in the housing 100, such that while the two pressure sensitive clamping elements 410 can be close to or away from each other, the two pressure sensitive clamping elements can be prevented from separating from the predetermined mounting positions.

In one embodiment, when the pressure of the water in the housing 100 is high, the two pressure sensitive clamping elements 410 approach to each other and press the pressure sensitive element 420 tightly, the pressure sensitive element 420 deforms towards the movable column 220, and the cross-sectional area of the pressure-flow regulating orifice 430 is reduced, thereby reducing the flow rate of the water.

When the pressure of the water in the housing 100 is low, the two pressure sensitive clamping elements 410 move away from each other, the pressure sensitive element 420 returns to the initial shape, and the cross-sectional area of the pressure-flow regulating orifice 430 is increased, thereby increasing the flow rate of the water.

In one embodiment, the pressure sensitive element 420 surrounds an outer side of the movable column 220, and the pressure-flow regulating orifice 430 is defined by an inner circumferential surface of the pressure sensitive element 420 and an outer circumferential surface of the movable column 220. When the two pressure sensitive clamping elements 410 press the pressure sensitive element 420 tightly, the pressure sensitive element 420 deforms towards the movable column 220, thereby reducing the cross-sectional area of the pressure-flow regulating orifice 430. When the two pressure sensitive elements 410 move away from each other, the pressure sensitive element 420 returns to the initial shape, thereby increasing the cross-sectional area of the pressure-flow regulating orifice 430. In addition, when the movable sleeve 320 drives the movable column 220 to move, since the movable column 220 moves linearly in an axis thereof, the cross-sectional area of the pressure-flow regulating orifice 430 may not be influenced.

In one embodiment, a cross-section of the movable column 200 may be in the shape of a plum blossom, a circle, a rectangle or any other symmetrical shapes.

The flow regulating device 60 according to some specific examples of the present disclosure is illustrated in FIGS. 1 to 6. As illustrated in FIGS. 1 to 6, the flow feedback assembly 500 includes a turbine blade 510, a magnetic rotor 520, and a hall element 530.

The turbine blade 510 is rotatably disposed in the housing 100. The magnetic rotor 520 is rotatably disposed in the housing 100 and adjacent to the turbine blade 510. The hall element 530 is mounted to an outer wall of the housing 100.

In one embodiment, when rotating, the turbine blade 510 drives nearby water stream to rotate, the rotating water stream pushes the magnetic rotor 520 to rotate, and the hall element 530 determines the flow rate of the water by sensing the rotation of the magnetic rotor 520 and feeds back the flow rate of the water to the control system 70 by means of control wires.

Further, as illustrated in FIGS. 3 and 6, the flow feedback assembly 500 further includes a rotating shaft seat 540 and a rotating shaft 550. The rotating shaft seat 540 is mounted in the housing 100 and in a fixed position. The rotating shaft 550 is mounted to the rotating shaft seat 540 and in a fixed position. The turbine blade 510 and the magnetic rotor 520 are rotatably mounted to the rotating shaft 550, and the rotating shaft seat 540 may be configured as a symmetrical straight blade structure. Therefore, the turbine blade 510 and the magnetic rotor 520 can be rotabably mounted in the housing 100.

The flow regulating device 60 according to some specific embodiments of the present disclosure is illustrated in FIGS. 1 to 6. As illustrated in FIGS. 1 to 6, the water inlet 110 and the water outlet 120 are defined in two ends of the housing 100 in an axial direction of the housing 100 respectively. The flow regulating assembly 200, the temperature sensitive assembly 300, the pressure sensitive assembly 400 and the flow feedback assembly 500 are arranged in the axial direction of the housing 100 and each located between the water inlet 110 and the water outlet 120 in the axial direction of the housing 100, in which the flow feedback assembly 500 is disposed adjacent to one of the water inlet 110 and the water outlet 120.

In one embodiment, in the axial direction of the housing 100, from the water inlet 110 to the water outlet 120, the pressure sensitive assembly 400, the flow regulating assembly 200 and the temperature sensitive assembly 300 are arranged sequentially, and the flow feedback assembly 500 is located between the pressure sensitive assembly 400 and the water inlet 110 or located between the temperature sensitive assembly 300 and the water outlet 120.

In one embodiment, two ends of the housing 100 can be connected to other pipes by means of a screw, a circlip, a clamping hoop, an inserted pin or other connection manners.

In some embodiments, the pressure sensitive assembly 400 and the flow feedback assembly 500 are optional components. In other words, the flow regulating device 60 may exclude the pressure sensitive assembly 400 and the flow feedback assembly 500, and may include at least one of the pressure sensitive assembly 400 and the flow feedback assembly 500.

An operation process of the gas water heater 1 according to embodiments of the present disclosure will be described in the following.

As illustrated in FIGS. 1 to 6, when the inflowing water having certain temperature flows through the flow regulating device 60, the temperature sensitive element 330 senses the temperature of the inflowing water to expand or contract linearly, so as to push the movable sleeve 320 to move. The movable sleeve 320 drives the movable column 220 to move, the position of the conical part 221 in the conical orifice is changed, and further the opening of the temperature-flow regulating orifice 230 can be changed, thereby changing the flow rate of the water. When the pressure of the inflowing water increases, the pressure sensitive element 420 deforms to change a gap between the pressure sensitive element 420 and the movable column 220, and further change the cross-sectional area of the pressure-flow regulating orifice 430, thereby achieving a steady flow. When the water flows through the turbine blade 510, the water stream rotates and pushes the magnetic rotor 520 to rotate, and the hall element 530 senses the rotation of the magnetic rotor 520 to determine the flow rate of the water and feeds it back to the control system 70. The control system 70 controls a proportion of gas supply in the gas control system 50 according to the flow rate of the water regulated and fed back by the flow regulating device 60, so as to control the combustion load of the combustion system 40 to obtain the ideal temperature of outflowing water.

Based on linear expansion of the temperature sensitive element 330, the flow regulating device 60 according to embodiments of the present disclosure can control the flow rate of the inflowing water and the temperature of the inflowing water to represent a certain function proportion relationship, and when the pressure of the inflowing water exceeds the preset pressure, the ideal temperature of the outflowing water can be achieved irrespective of whether the temperature of the inflowing water is high or low. Thus, the temperature of the outflowing water is constant and has a small fluctuation, and the flow rate is stable when the water is used at multiple positions at the same time and the pressure of the water is too large. Compared with a stepping motor type water proportional valve, since the repeated judgment and calculation of the controller are not required, the response time is remarkably shortened. The flow rate of the inflowing water is controlled to be stable by means of the deformation of the pressure sensitive element 420, such that the steady flow can be achieved. The flow rate of the inflowing water is automatically controlled from the source, instead of controlling the flow rate of the water according to rear-end feedback after use. Furthermore, the regulated flow rate of the water can be fed back.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise," should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A flow regulating device, comprising:

a housing defining a water inlet and a water outlet;

a flow regulating assembly disposed in the housing, the flow regulating assembly defining a temperature-flow regulating orifice between the water inlet and the water outlet, and the flow regulating assembly further comprising a regulating component for regulating opening of the temperature-flow regulating orifice;

a temperature sensitive assembly disposed in the housing and connected to the regulating component, and the temperature sensitive assembly driving the regulating component according to temperature of water in the housing; and a pressure sensitive assembly disposed in the housing, a pressure-flow regulating orifice with a changeable cross-sectional area being defined between the pressure sensitive assembly and the flow regulating assembly, and being located between the water inlet and the water outlet, and the pressure sensitive assembly regulating the cross-sectional area of the pressure-flow regulating orifice according to pressure of water in the housing.

2. The flow regulating device according to claim 1, wherein the temperature sensitive assembly comprises:
   a fixed temperature sensitive casing mounted in the housing;
   a movable sleeve movably fitted over the fixed temperature sensitive casing and connected to the regulating component;
   a temperature sensitive element with a changeable volume according to a temperature, disposed between the fixed temperature sensitive casing and the movable sleeve, the temperature sensitive element pushing the movable sleeve to move in a direction away from the fixed temperature sensitive casing by means of its own expansion;
   a support seat mounted in the housing; and
   a temperature sensitive elastic element disposed between the movable sleeve and the support seat and normally pushing the movable sleeve towards the fixed temperature sensitive casing.

3. The flow regulating device according to claim 2, wherein the fixed temperature sensitive casing comprises:
   a mounting seat mounted in the housing;
   a temperature sensitive outer casing, temperature sensitive outer casing and the movable sleeve defining an accommodating cavity with a changeable volume together, and the temperature sensitive element being disposed in the accommodating cavity; and
   a supporting elastic element disposed between the temperature sensitive outer casing and the movable sleeve, the temperature sensitive outer casing normally abutting against the mounting seat under action of the supporting elastic element, and a temperature sensitive channel being defined between the temperature sensitive outer casing and the mounting seat.

4. The flow regulating device according to claim 3, wherein the supporting elastic element is a spring, the temperature sensitive outer casing is provided with a temperature sensitive boss, the supporting elastic element is fitted over the temperature sensitive outer casing, and two ends of the supporting elastic element abut against the temperature sensitive boss and the movable sleeve respectively.

5. The flow regulating device according to claim 2, wherein the temperature sensitive elastic element is a spring, the movable sleeve is provided with a sleeve boss, the temperature sensitive elastic element is fitted over the movable sleeve, two ends of the temperature sensitive elastic element abut against the sleeve boss and the support seat respectively, a sleeve channel is defined in the sleeve boss, and a support seat channel is defined between the movable sleeve and the support seat.

6. The flow regulating device according to claim 2, wherein the temperature sensitive element is paraffin.

7. The flow regulating device according to claim 1, wherein the flow regulating assembly comprises: a fixed seat mounted in the housing, the temperature-flow regulating orifice being defined in the fixed seat;
   the regulating component being a movable column connected to the temperature sensitive assembly, and the movable column regulating the opening of the temperature-flow regulating orifice by moving relative to the fixed seat.

8. The flow regulating device according to claim 7, wherein the temperature-flow regulating orifice is a conical orifice having a cross-sectional area increasing gradually from the water outlet to the water inlet, the movable column is provided with a conical part having a shape conforming to a shape of the conical orifice, and the movable column regulates the opening of the temperature-flow regulating orifice by changing a position of the conical part in the temperature-flow regulating orifice.

9. The flow regulating device according to claim 1, wherein the water inlet and the water outlet are defined at two ends of the housing in an axial direction of the housing respectively, the flow regulating assembly and the temperature sensitive assembly are arranged in the axial direction of the housing and located between the water inlet and the water outlet along the axial direction of the housing.

10. The flow regulating device according to claim 1, wherein the pressure sensitive assembly comprises:
    two pressure sensitive clamping element disposed in the housing and close to or away from each other; and
    a pressure sensitive element with a changeable shape according to pressure, disposed between the two pressure sensitive clamping elements, the pressure-flow regulating orifice being defined between the pressure sensitive element and the flow regulating assembly, and the pressure sensitive element regulating the cross-sectional area of the pressure-flow regulating orifice by means of its own deformation.

11. The flow regulating device according to claim 10, wherein the pressure sensitive element is rubber.

12. The flow regulating device according to claim 1, wherein the water inlet and the water outlet are defined at two ends of the housing in an axial direction of the housing respectively, the flow regulating assembly, the temperature sensitive assembly and the pressure sensitive assembly are arranged in the axial direction of the housing and located between the water inlet and the water outlet along the axial direction of the housing.

13. The flow regulating device according to claim 1, further comprises:
    a flow feedback assembly disposed to the housing and configured to detect a flow rate of water in the housing and performing feedback.

14. The flow regulating device according to claim 13, wherein the flow feedback assembly comprises:
    a turbine blade rotatably disposed in the housing, and driving a nearby water stream to rotate while rotating;
    a magnetic rotor rotatably disposed in the housing and adjacent to turbine blade, the magnetic rotor being rotated by the rotating water stream; and
    a hall element mounted to an outer wall of the housing, the hall element judging the flow rate of the water by sensing rotation of the magnetic rotor and performing feedback.

15. The flow regulating device according to claim 14, wherein the flow feedback assembly further comprises:
    a rotating shaft seat mounted in the housing; and
    a rotating shaft mounted to the rotating shaft seat, the turbine blade and the magnetic rotor being rotatably mounted to the rotating shaft.

16. The flow regulating device according to claim 13, wherein the water inlet and the water outlet are defined at two ends of the housing in an axial direction of the housing respectively, the flow regulating assembly, the temperature sensitive assembly and the flow feedback assembly are arranged in the axial direction of the housing and located between the water inlet and the water outlet along the axial direction of the housing, and the flow feedback assembly is disposed adjacent to one of the water inlet and the water outlet.

17. A gas water heater, comprising
    a heat exchange system;

a water inlet device in communication with the heat exchange system;

a water outlet device in communication with the heat exchange system;

a combustion system for heating the heat exchange system;

a gas control system in communication with the combustion system; and a flow regulating device, comprising:

a housing defining a water inlet and a water outlet;

a flow regulating assembly disposed in the housing, the flow regulating assembly defining a temperature-flow regulating orifice between the water inlet and the water outlet, and the flow regulating assembly further comprising a regulating component for regulating opening of the temperature-flow regulating orifice; and a temperature sensitive assembly disposed in the housing and connected to the regulating component, and the temperature sensitive assembly driving the regulating component according to temperature of water in the housing, wherein the flow regulating device is connected between the water inlet device and the heat exchange system, the water inlet is in communication with the water inlet device, and the water outlet is in communication with the heat exchange system.

18. The gas water heater according to claim 17, wherein the flow regulating device further comprises a flow feedback assembly disposed to the housing and configured to detect a flow rate of water in the housing and performing feedback, the gas water heater further comprises a control system communicating with the flow feedback assembly and the gas control system, and the control system controls a proportion of gas supply in the gas control system according to the flow rate of the water fed back by the flow feedback assembly.

\* \* \* \* \*